July 26, 1938.   D. DE F. CRANDELL   2,125,046
METHOD OF PRODUCING PLASTER MATERIALS
Filed Sept. 20, 1935
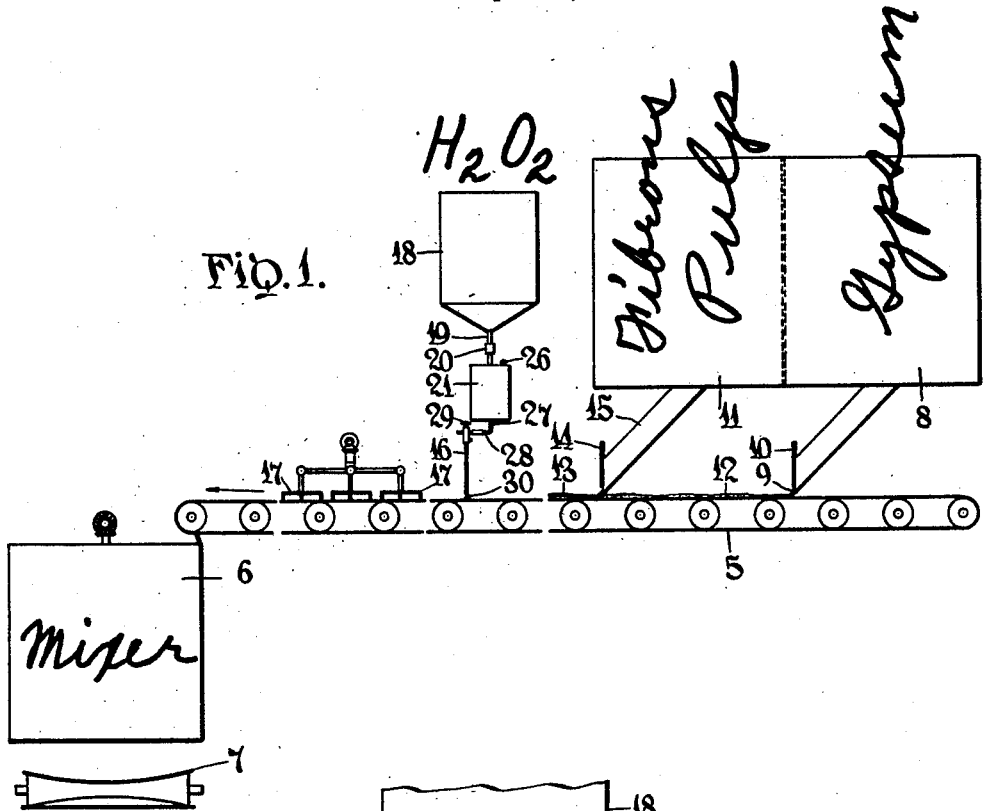
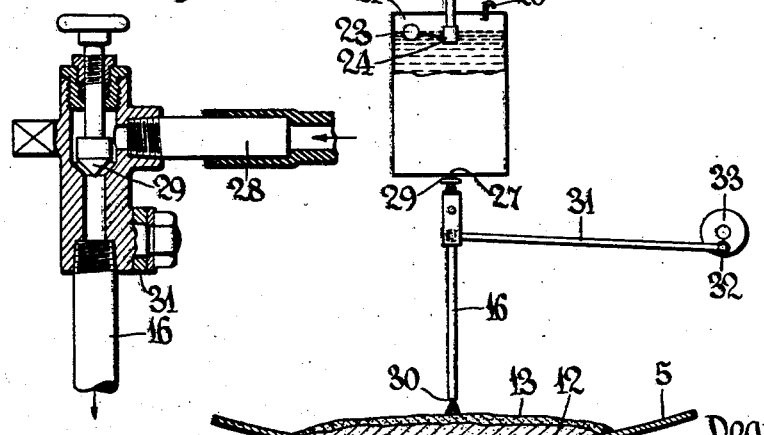
INVENTOR
Dean D. Crandell,
BY
Beau, Brooks, Buckley & Beau.
ATTORNEYS Patented July 26, 1938

2,125,046

UNITED STATES PATENT OFFICE 2,125,046

METHOD OF PRODUCING PLASTER MATERIALS

Dean De Forest Crandell, Buffalo, N. Y., assignor to National Gypsum Company, Buffalo, N. Y.

Application September 20, 1935, Serial No. 41,497

1 Claim. (Cl. 83—73)

This invention relates to an apparatus for and a method of preparing porous building materials, more particularly vesicular plaster board where hydrogen peroxide is the material used to produce the gas bubbles inducing the porosity of the finished product.

In the preparation of porous cementitious products the strength of the product is very materially affected by the uniformity of distribution of the gas bubbles within the body of the porous building structure and by the uniformity of size of the individual pores. The production of a porous product, therefore, depends upon the uniform distribution of the gas generating hydrogen peroxide throughout the plastic mix prior to its set.

The atmosphere in gypsum plants and mills is in general filled with fine flour or dust of ground gypsum so that fine orifices are prone to clog due to the accumulation of such dust in the fine openings or orifices. The hydrogen peroxide must therefore be added in a substantially large stream and yet in controlled and regulated amounts so as not to have an excess of this expensive chemical and such quantity that the individual pores are so large that the finished product possesses insufficient strength for the desired use.

In accordance with the present invention hydrogen peroxide is added at a substantially constant rate to plaster or stucco moved at a constant rate in constant amount upon an endless belt or other suitable contrivance.

An object of the present invention is, therefore, the provision of a method of adding hydrogen peroxide in controlled quantities to specified amounts of a plaster mix and in a manner providing for uniform distribution of the hydrogen peroxide throughout the mix.

Among other objects of the invention, is the provision of an apparatus with an orifice sufficiently large as not to be clogged by mineral dust or powder, and yet to provide for a constant rate of discharge of hydrogen peroxide and a uniform distribution of the peroxide with the plaster.

In the drawing Fig. 1 is a diagrammatic view of an apparatus suitable for use in the manufacture of porous gypsum products such as wall board, while Fig. 2 is an enlarged view showing the means of discharging hydrogen peroxide to the mix. Fig. 3 is an enlarged view of the peroxide distributing mechanism.

Referring more particularly to the drawing, endless belt 5, adapted to carry a measured charge of plaster mix suitable for the preparation of plaster building materials such as wall board, discharges into mixing chamber 6 preparatory to being fed upon the forming belt or board belt 7. The cementitious material from which the building product is to be made is discharged from container or reservoir 8 upon belt 5, the quantity being regulated by the speed of movement of belt 5, and by regulating the size of discharge orifice 9 from reservoir 8, as by means of gate valve 10.

Where calcined gypsum stucco or plaster is the cementitious material, it may be mixed with predetermined quantities of water in reservoir 8 before discharge upon belt 5, or, as the more general practice, plaster is discharged in a dry condition where the same is to be mixed with fiber pulp for the production of wall board of the so-called light weight type. In such a procedure the fibrous pulp is prepared in a pulp beater and brought to the proper consistency and pulp content by addition of the amount of water required to be mixed with the calcined gypsum and transferred to pulp storage or reservoir 11 and is fed from there upon the plaster 12 already discharged upon the endless belt. The rate of discharge of pulp 13 upon plaster 12 is suitably controlled as, for instance, by means of gate valve 14 controlling the size of orifice of chute 15.

The charge of plaster and wet pulp is carried along on endless belt 5 toward the point of hydrogen peroxide addition and the water from the pulp seeps through the plaster, hydrogen peroxide being then discharged upon this mixture from a discharge nozzle 16, the mixture thereafter being thoroughly agitated to distribute the pulp throughout the plaster by means of the rotating mixing prongs 17.

Hydrogen peroxide of any desirable or convenient concentration, such as 100 volume hydrogen peroxide is contained in the storage tank 18, and flows by means of gravity feed through pipe 19 to filters 20, provided with a suitable filtering medium such as glass wool or the like, to a reservoir 21 wherein a constant head of hydrogen peroxide is maintained. The level of the peroxide in reservoir 21 is maintained at a constant head by means of float 23 attached to valve 24 controlling the discharge of peroxide. Reservoir 21 is provided with a breather pipe 26 to compensate for the small rise and fall of head of peroxide within the reservoir. Reservoir 21 is also provided wiht a discharge exit 27 adjacent its lower end to which is attached a conduit 28 provided with needle valve 29 capable of being set to given a constant discharge orifice under influence of the constant head of peroxide contained in reservoir 21. The orifice of valve 29 is sufficiently large to permit passage of whatever residual flour or dust may be picked up by the peroxide without danger of clogging at this point. After passing through the needle valve, the hydrogen peroxide is discharged from nozzle 16 provided with a discharge orifice 30 of relatively large diameter, which nozzle may be preferably made of glass.

Means are provided for oscillating discharge nozzle 16 laterally of endless belt 5 and the embodiment shown in the drawing comprises a pitman or rod 31 attached to discharge nozzle or tube 16 at a point below needle valve 29, pitman 31 being attached at 32 at its other end eccentrically of rotatable member 33 whereby upon rotation of member 33 the desired movement of nozzle 16 laterally of the belt is induced.

It will be seen that upon movement of the belt 5 at a constant rate and having a substantially constant load of material thereon, hydrogen peroxide is added or fed to the load upon the belt in such manner that a substantially uniform addition of peroxide is effected per unit of time per unit of weight of charge. In order to render the distribution more uniform and to activate the liberation of oxygen from the peroxide, the mixture of plaster, water and peroxide is agitated by means of the prongs 17, discharged into mixing tank 6 and sufficient alkali added thereto to render the reaction of the mass alkaline. The whole mass is then agitated and mixed in mixing tank 6 prior to discharge thereof upon the board machine, where complete and uniform mixture of the peroxide and alkali throughout the mass is insured and evolution of oxygen occurs with the production of an aerated spongy plastic mass setting to a porous vesicular product having uniformly distributed pores of uniform size.

From the foregoing it will be seen that the present invention provides a method and apparatus by means of which a uniform distribution of hydrogen peroxide can be obtained throughout a plastic mix with the addition of peroxide in controlled amounts and under conditions where uniform distribution is a prerequisite to the production of an acceptable product.

What is claimed is:

The method of producing porous building materials from plaster, water and aqueous hydrogen peroxide which comprises moving a mix of plaster at a substantially constant rate, confining said plaster during its movement to a substantially constant width and depth, and adding to the upper surface of said plaster during its movement a substantially constant stream of water and hydrogen peroxide transversely of the direction of movement of said plaster, moving the stream at a substantially constant rate from one side to the other of said mix, and thereafter mixing said aqueous hydrogen peroxide with said plaster.

DEAN DE FOREST CRANDELL.